(12) United States Patent
Jung et al.

(10) Patent No.: US 11,712,674 B2
(45) Date of Patent: Aug. 1, 2023

(54) GRAPHENE MANUFACTURING DEVICE AND GRAPHENE MANUFACTURING METHOD USING SAME

(71) Applicants: CENTER FOR ADVANCED META-MATERIALS, Daejeon (KR); KOREA INSTITUTE OF MACHINERY-MATERIALS, Daejeon (KR)

(72) Inventors: Hyun June Jung, Daejeon (KR); Jae Hyun Kim, Daejeon (KR); Se Jeong Won, Daejeon (KR); Jong Jin Park, Sejong-Si (KR); Jun Hyuk Kwak, Sejong-Si (KR); Hak Joo Lee, Daejeon (KR); Bong Kyun Jang, Daejeon (KR); Hyun Sung Park, Sejong-si (KR); Kyung Sik Kim, Daejeon (KR)

(73) Assignees: CENTER FOR ADVANCED META-MATERIALS, Daejeon (KR); KOREA INSTITUTE OF MACHINERY-MATERIALS, Daejeon (KR)

(*) Notice: Subject to any disclaimer, the term of this patent is extended or adjusted under 35 U.S.C. 154(b) by 138 days.

(21) Appl. No.: 17/416,518

(22) PCT Filed: Dec. 18, 2019

(86) PCT No.: PCT/KR2019/017939
§ 371 (c)(1),
(2) Date: Jun. 21, 2021

(87) PCT Pub. No.: WO2020/130608
PCT Pub. Date: Jun. 25, 2020

(65) Prior Publication Data
US 2022/0055001 A1    Feb. 24, 2022

(30) Foreign Application Priority Data

Dec. 21, 2018  (KR) .................. 10-2018-0167284

(51) Int. Cl.
*B01J 8/00*    (2006.01)
*C01B 32/184*  (2017.01)

(52) U.S. Cl.
CPC .............. *B01J 8/008* (2013.01); *B01J 8/001* (2013.01); *C01B 32/184* (2017.08); *B01J 2208/00017* (2013.01)

(58) Field of Classification Search
CPC .. B01J 8/008; B01J 8/001; B01J 2208/00017; B01J 3/03; B01J 4/002; B01J 15/00;
(Continued)

(56) References Cited

FOREIGN PATENT DOCUMENTS

KR    10-1168259 B1    7/2012
KR    10-1238450 B1    2/2013
(Continued)

OTHER PUBLICATIONS

Machine Translation of WO 2013/191347 to Kim (Year: 2013).*
International Search Report for PCT/KR2019/017939 dated May 28, 2020 from Korean Intellectual Property Office.

*Primary Examiner* — Daniel C. McCracken
(74) *Attorney, Agent, or Firm* — Revolution IP, PLLC (57) ABSTRACT

A graphene manufacturing device using Joule heating includes: a chamber having a space provided therein so as to synthesize graphene; and a first roller portion and a second roller portion disposed inside the chamber to be spaced from each other such that same support a catalyst metal penetrating the interior of the chamber and are supplied with an electric current for graphene synthesis, thereby Joule-heating the catalyst metal. In order to compensate for a temperature deviation of the catalyst metal passing between the first roller portion and the second roller portion, a first area
(Continued)

of the catalyst metal, which is close to the first roller portion, and a second area of the catalyst metal, which is close to the second roller portion, are disposed to have movement paths facing each other.

12 Claims, 4 Drawing Sheets

(58) Field of Classification Search
CPC ............. B01J 19/0013; B01J 19/0073; B01J 19/1887; B01J 19/22; B01J 3/006; B01J 19/087; C01B 32/184; C01B 32/186; C01B 32/182; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; Y02P 20/141

See application file for complete search history.

(56) References Cited

FOREIGN PATENT DOCUMENTS

| KR | 10-1581362 B1 | 12/2015 | |
|---|---|---|---|
| KR | 10-2017-0060408 A | 6/2017 | |
| KR | 10-1801272 B1 | 11/2017 | |
| WO | WO 2013/191347 | * 12/2013 | ............. C01B 31/02 |

* cited by examiner

GRAPHENE MANUFACTURING DEVICE AND GRAPHENE MANUFACTURING METHOD USING SAME

TECHNICAL FIELD

The present invention relates to a graphene manufacturing device and a graphene manufacturing method using the same, and more particularly to a graphene manufacturing device using Joule heating, that is, a process by which passage of electric current through a conductor produces heat, and a graphene manufacturing method using the same.

BACKGROUND ART

Materials composed of carbon atoms include fullerenes, carbon nanotubes, graphene, and graphite. Thereamong, graphene is a two-dimensional monolayer sheet of carbon atoms.

In particular, graphene has not only stable and excellent electrical, mechanical, and chemical properties but also good electrical conductivity, and thus allows much faster electron transfer than silicon and a much larger current flow than copper. This has been proved by experiments since a method of separating graphene from graphite was reported in 2004, and many studies have been conducted in this regard.

In addition, graphene can be formed in a large area as well as having electrical, mechanical, and chemical stability and good thermal and electrical conductivity, and thus draws attention as a basic material for electronic circuits.

Further, graphene has electrical properties varying depending on crystal orientation thereof at a given thickness and thus can be adjusted to exhibit electrical properties desired by a user, thereby allowing easy device design. Thus, graphene can be effectively used in carbon-based electrical or electromagnetic devices.

However, in conventional graphene manufacturing devices and methods using Joule heating, a series of equipment for supply and collection of a catalytic metal is disposed in a vacuum chamber, resulting in poor connection between a graphene synthesis process and previous/subsequent processes and unnecessarily large size of the chamber.

In addition, such conventional graphene manufacturing devices and methods using Joule heating have a problem in that, when a catalytic metal is heated by electric current delivered to electrodes disposed at opposite sides of the catalytic metal, heat dissipation occurs due to resistance of the electrodes upon passage of the electric current through the electrodes, which produces a non-uniform temperature profile in which the temperature of the catalytic metal M sharply decreases from a central region farthest from the electrodes toward end regions close to the electrodes, making it difficult to synthesize uniform graphene.

DISCLOSURE

Technical Problem

Embodiments of the present invention have been conceived to overcome such a problem in the art, and provide a graphene manufacturing device which allows at least some regions of a catalytic metal passing through a section between first and second roller units heating the catalytic metal by Joule heating to have respective movement paths facing each other to compensate for temperature variation in the catalytic metal between the first roller unit and the second roller unit, thereby ensuring maintenance of a uniform temperature across the entire area of the catalytic metal, and a graphene manufacturing method using the same.

Technical Solution

In accordance with one aspect of the present invention, a graphene manufacturing device includes: a chamber having an inner space for graphene synthesis; and a first roller unit and a second roller unit disposed in the chamber with a distance therebetween, supporting a catalytic metal passing through an inside of the chamber, and heating the catalytic metal by Joule heating using electric current supplied thereto for graphene synthesis, wherein a first region of the catalytic metal close to the first roller unit and a second region of the catalytic metal close to the second roller unit are positioned to have respective movement paths facing each other to compensate for temperature variation in the catalytic metal passing through a section between the first roller unit and the second roller unit.

Here, the first region and the second region may have the respective movement paths facing each other as the catalytic metal sags between the first roller unit and the second roller unit.

The graphene manufacturing device may further include: a displacement sensor disposed below the first roller unit and the second roller unit and detecting whether a sagging length of the catalytic metal with respect to the first roller unit and the second roller unit matches a reference sagging length; and a controller controlling a rotational speed of the first roller unit or the second roller unit to match the sagging length of the catalytic metal detected by the displacement sensor with the reference sagging length.

The chamber may include: an inlet port through which the catalytic metal is introduced into the chamber; and an outlet port through which the catalytic metal with graphene synthesized thereon is discharged from the chamber, wherein the graphene manufacturing device may further include: a sealing guide disposed in each of the inlet port and the outlet port and having a guide hole elastically contacting a surface of the catalytic metal passing therethrough to guide movement of the catalytic metal and to prevent intrusion of external air.

Here, the sealing guide may include a pair of sealing guides spaced apart from each other in a movement direction of the catalytic metal, wherein the graphene manufacturing device may further include: an auxiliary vacuum pump evacuating a space between the pair of sealing guides.

The sealing guide may include: a guide body having a first through-hole through which the catalytic metal passes; a guide cover having a second through-hole through which the catalytic metal passes; a sealing member interposed between the guide body and the guide cover and having the guide hole; and a fastening member fastening the guide body and the guide cover to each other with the sealing member interposed therebetween.

The guide hole disposed in the outlet port has a larger size than the guide hole disposed in the inlet port to minimize loss of graphene during passage of the catalytic metal with the graphene synthesized thereon through the outlet port.

The graphene manufacturing device may further include: a protective film feed unit disposed inside the chamber to form a protective layer on a graphene layer of the catalytic metal having passed through the first roller unit and the second roller unit.

The graphene manufacturing device may further include: a roller moving member allowing the first roller unit and the second roller unit to be moved toward each other or away from each other to adjust a distance between the first region and the second region.

In accordance with another aspect of the present invention, there is provided a graphene manufacturing method using the graphene manufacturing device set forth above, the graphene manufacturing method including: a supply step in which the catalytic metal is supplied into the chamber; a positioning step in which the catalytic metal is positioned in the chamber such that the first region of the catalytic metal close to the first roller unit and the second region of the catalytic metal close to the second roller unit have respective movement paths facing each other to compensate for temperature variation in the catalytic metal passing through the section between the first roller unit and the second roller unit; a synthesis step in which graphene is synthesized on the catalytic metal; and a collection step in which the catalytic metal with the graphene synthesized thereon is collected from the chamber.

In the positioning step, the first region and the second region may have the respective movement paths facing each other as the catalytic metal sags between the first roller unit and the second roller unit.

The graphene manufacturing method may further include: a detection step in which whether a sagging length of the catalytic metal with respect to the first roller unit and the second roller unit matches a reference sagging length is detected; and an adjustment step in which a rotational speed of the first roller unit or the second roller unit is controlled to match the sagging length of the catalytic metal with the reference sagging length, the detection step and the adjustment step being performed after the positioning step.

The graphene manufacturing method may further include: a protective film forming step in which a protective layer is formed on a graphene layer of the catalytic metal having passed through the first roller unit and the second roller unit, the protective film forming step being performed after the synthesis step.

Advantageous Effects

The graphene manufacturing device and the graphene manufacturing method according to embodiments of the present invention allows the catalytic metal passing through the section between the first roller unit and the second roller unit to be positioned such that the first region and the second region of the catalytic metal, which are located at opposite sides close to the electrode rollers with respect to the central region farthest from the electrode rollers, can have respective movement paths facing each other to exchange radiant heat with each other, and thus can produce a uniform temperature profile across the entire area of the catalytic metal passing through the section between the first roller unit and the second roller unit. As a result, uniform graphene can be obtained.

In addition, the graphene manufacturing device and the graphene manufacturing method according to embodiments of the present invention can provide not only thermal compensation between the first region and the second region of the catalytic metal facing each other, but also a greenhouse effect in a space defined by the first region and the second region, and thus can ensure uniform maintenance of a generally high temperature profile across the entire area of the catalytic metal with limited power supply.

In addition, the graphene manufacturing device and the graphene manufacturing method according to embodiments of the present invention can produce a uniform temperature profile over a large length (area) of the catalytic metal passing through the section between the first roller unit and the second roller unit, thereby ensuring a significantly high yield of high-quality graphene, as compared with conventional graphene manufacturing devices and methods, In addition, the graphene manufacturing device and the graphene manufacturing method according to embodiments of the present invention can accurately set and adjust the lengths of the first region and the second region of the catalytic metal facing each other through control over the first roller unit and the second roller unit based on a value detected by the displacement sensor, thereby ensuring maintenance of a uniform temperature profile across the catalytic metal during synthesis of the graphene.

In addition, the graphene manufacturing device and the graphene manufacturing method according to the embodiments of the present invention can ensure space saving and downsizing of the chamber and can facilitate preparation for graphene manufacture and management of previous/subsequent processes through disposition of the feed unit/the collection unit at the outside of the chamber, that is, in an atmospheric pressure environment.

In addition, through separation of the collection unit, which collects the catalytic metal with the graphene synthesized thereon, from the chamber in which synthesis of the graphene is performed, the graphene manufacturing device and the graphene manufacturing method according to the embodiments of the present invention can prevent contamination of synthesized graphene at the collection unit side.

In addition, with the sealing guide guiding movement of the catalytic metal into/out of the chamber, the graphene manufacturing device and the graphene manufacturing method according to embodiments of the present invention can ensure damage/loss free transfer of bare catalytic metal or catalytic metal with graphene synthesized thereon and stable maintenance of a vacuum atmosphere inside the chamber through prevention of intrusion of external air.

BEST MODE

Hereinafter, embodiments of the present invention will be described with reference to the accompanying drawings. It should be noted that like components will be denoted by like reference numerals throughout the specification and the accompanying drawings, and repeated description thereof will be omitted for clarity.

Figure 1:
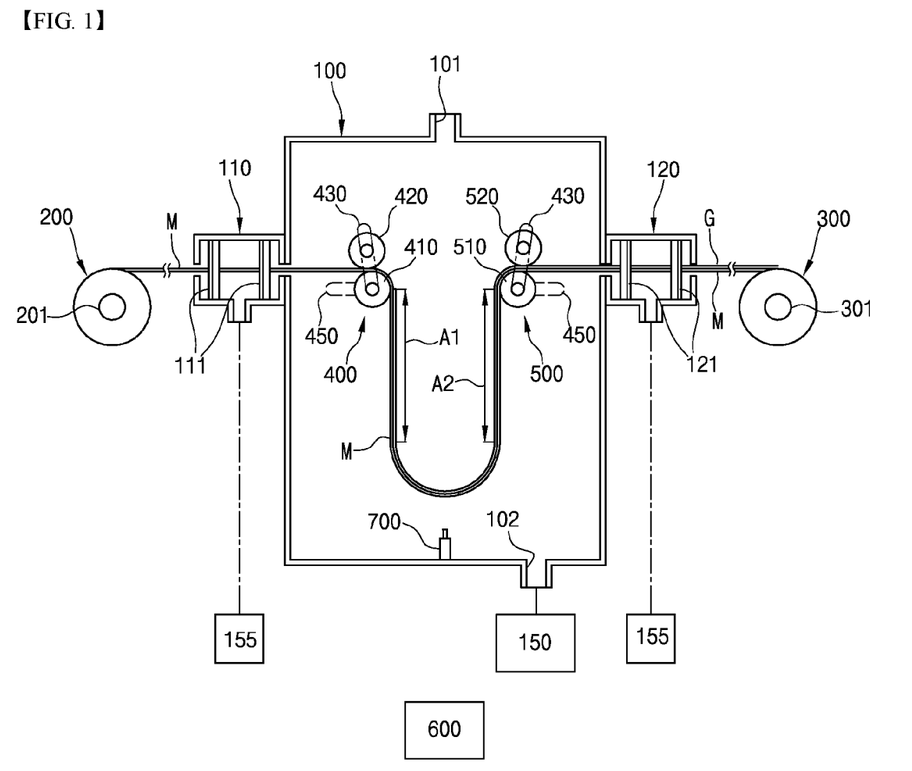
FIG. 1 is a schematic diagram of a graphene manufacturing device according to one embodiment of the present invention.

FIG. 1 is a schematic diagram of a graphene manufacturing device according to one embodiment of the present invention.

Referring to FIG. 1, the graphene manufacturing device according to this embodiment includes a chamber 100, a feed unit 200, a collection unit 300, a first roller unit 400, a second roller unit 500, and a controller 600.

The chamber 100 has an inner space for formation of graphene G.

In addition, the chamber 100 may include a gas inlet 101 through which gases for synthesis of the graphene G are introduced into the chamber and a gas outlet 102 through which the gases are discharged from the chamber.

A reaction gas (feed gas), which is a carbon-containing gas, may be supplied to the chamber 100 through the gas inlet 101. The reaction gas may include, for example, at least one selected from the group consisting of methane, carbon monoxide, carbon dioxide, ethane, ethylene, ethanol, acetylene, propane, propylene, butane, butadiene, pentane, pentene, cyclopentadiene, hexane, cyclohexane, benzene, and toluene.

Besides the reaction gas, a carrier gas for transporting the reaction gas to a catalytic metal M and a reducing gas for removing impurities from a surface of the catalytic metal M may be supplied to the chamber 100 through the gas inlet 101. The carrier gas may include an inert gas such as helium and argon, and the reducing gas may include a non-reaction gas such as hydrogen. That is, hydrogen gas used as the reducing gas induces a reducing atmosphere to control (that is, remove) impurities in the catalytic metal through reduction with the catalytic metal.

The gas outlet 102 of the chamber 100 allows the reaction gas needed for synthesis of the graphene G, the carrier gas, and the reducing gas to fill the chamber 100 or to be discharged therethrough.

The graphene manufacturing device may further include a main vacuum pump 150 disposed at the gas outlet 102 of the chamber 100. The main vacuum pump serves to evacuate the chamber 100.

In addition, the chamber 100 may include an inlet port 110 through which the catalytic metal M is introduced into the chamber 100 and an outlet port 120 through which the catalytic metal M with the graphene G synthesized thereon is discharged from the chamber 100.

The feed unit 200 supplies the catalytic metal M for synthesis of the graphene G, and may be disposed outside the chamber 100. In other words, the feed unit 200 may be disposed at an outside of the chamber 100 under atmospheric pressure, rather than an inside of the chamber 100 under a vacuum atmosphere.

For example, the feed unit 200 may include a feed roller 201. As the feed roller 201 is rotated, the catalytic metal M is unrolled from the feed roller 201 to be supplied into the chamber 100.

Since the feed roller 201 can directly contact the catalytic metal M heated by Joule heating, it is desirable that a portion of the feed roller 201 contacting the catalytic metal M be formed of a thermally insulating material.

Advantageously, disposition of the feed unit 200 outside the chamber 100 rather than inside the chamber 100 allows space saving and downsizing of the chamber 100 due to exclusion of the feed unit 200 from the chamber 100.

The collection unit 300 collects the catalytic metal M with the graphene G synthesized thereon and may be disposed outside the chamber 100, like the feed unit 200. That is, the collection unit 300 may be disposed at the outside of the chamber 100 under atmospheric pressure, rather than the inside of the chamber 100 under the vacuum atmosphere.

For example, the collection unit 300 may include a collection roller 301. As the collection 301 is rotated, the catalytic metal M with the graphene G synthesized thereon is rolled onto and collected by the collection roller 301.

Since the collection roller 301 can also directly contact the catalytic metal M heated by Joule heating, it is desirable that a portion of the collection roller 301 contacting the catalytic metal M be formed of a thermally insulating material.

Advantageously, disposition of the collection unit 300 outside the chamber 100 rather than inside the chamber 100 allows space saving and downsizing of the chamber 100 due to exclusion of the collection unit 300 from the chamber 100.

As the feed roller of the feed unit 200 and the collection roller 301 of the collection unit 300 are rotated in the same direction at the same speed, the catalytic metal M can be moved at a uniform speed.

Here, the feed unit 200 and the collection unit 300 may be controlled independently of each other.

That is, the rotational speed of each of the feed roller 201 of the feed unit 200 and the collection roller 301 of the collection unit 300 may be individually controlled by the controller, whereby the feed rate and collection rate of the catalytic metal M can be adjusted. In addition, through this, the catalytic metal passing through a section between the feed unit 200 and the first roller unit 400 can stably maintain a horizontal position and the catalytic metal passing through a section between the second roller unit 500 and the collection unit 300 can stably maintain a horizontal position.

As described above, since the feed unit 200 and the collection unit 300 are disposed outside the chamber 100, the chamber 100 may include the inlet port 110 through which the catalytic metal M supplied from the feed unit 200 is introduced into the chamber 100 and the outlet port 120 through which the catalytic metal M with the graphene G synthesized thereon is discharged from the chamber 100 toward the collection unit 300.

Figure 2:
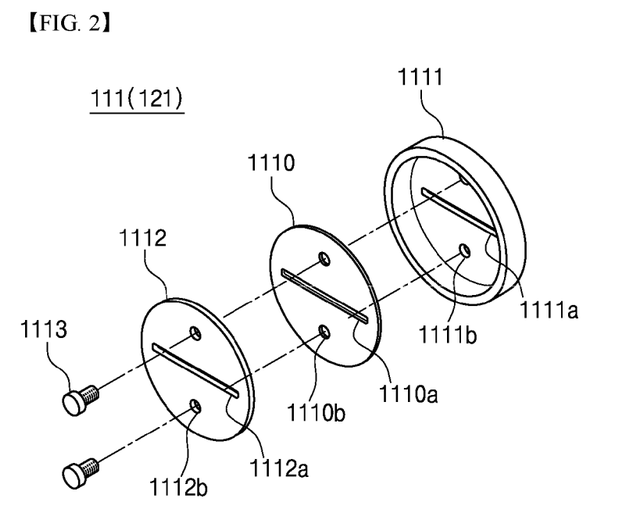
FIG. 2 is an exploded perspective view of a sealing guide of the graphene manufacturing device according to one embodiment of the present invention.

FIG. 2 is an exploded perspective view of a sealing guide of the graphene manufacturing device according to one embodiment of the present invention.

Referring to FIG. 1 and FIG. 2, each of the inlet port 110 and the outlet port 120 may be provided with a sealing guide 111 or 121 having a guide hole 1110a elastically contacting a surface of the catalytic metal M passing therethrough to guide movement of the catalytic metal M and to prevent intrusion of external air.

The sealing guide 111 or 121 may be disposed inside each of the inlet port 110 and the outlet port 120, such that an inner space of each of the inlet port 110 and the outlet port 120 can be isolated from an outside environment by the sealing guide 111 or 121.

In some embodiments, the sealing guide 111 or 121 may include: a guide body 1111 having a first through-hole 1111a through which the catalytic metal M passes; a guide cover 1112 having a second through-hole 1112a through which the catalytic metal M passes; a sealing member 1110 interposed between the guide body 1111 and the guide cover 1112 and having the guide hole 1110a elastically contacting the surface of the catalytic metal M passing therethrough; and a fastening member 1113 passing through and fastening the guide body 1111 and the guide cover 1112 with the sealing member 1110 interposed therebetween. Reference numerals 1110b, 1111b, and 1112b, which have not been described, denote fastening holes to which the fastening member 1113 is fastened.

The sealing member 1110 may be formed of rubber or silicone. However, it will be understood that the present invention is not limited thereto and the sealing member 1110 may be formed of any elastic material. Further, the sealing member 1110 may be formed of a metamaterial or an auxetic material.

Preferably, the guide hole 1110a formed on the sealing member 1110 is smaller than a cross-sectional profile of the catalytic metal M. In this way, an inner peripheral surface of the guide hole 1110a can elastically contact the surface of the catalytic metal M passing through the guide hole 1110a, thereby preventing intrusion of external air through a gap between the catalytic metal M and the guide hole 1110a.

In addition, since the guide hole 1110a elastically contacts the catalytic metal M passing through the guide hole 1110a, resistance to movement of the catalytic metal M can be minimized and damage to the surface of the catalytic metal M, such as scratches, can be prevented.

Here, it is desirable that the guide hole 1110a of the sealing guide 121 disposed in the outlet port 120 have a larger size than the guide hole 1110a of the sealing guide 111 disposed in the inlet port 110.

That is, since the sealing guide 111 of the inlet port 110 allows the catalytic metal M from the feed unit 200 to pass therethrough and the sealing guide 121 of the outlet port 120 allows the catalytic metal M with the graphene G synthesized thereon to pass therethrough, the guide hole 1110a of the sealing guide 121 disposed in the outlet port 120 may have a larger size and the guide hole 1110a of the sealing guide 111 disposed in the inlet port 110 may have a smaller size so as to correspond to sizes (thicknesses) of the cross-sectional profile of the catalytic metal M before and after synthesis of the graphene G on the catalytic metal M, respectively.

For example, the sealing member 1110 of the inlet port 110 may have a guide hole 1110a having a size corresponding to the cross-sectional profile of a bare catalytic metal M, and the sealing member 1110 of the outlet port 120 may have a guide hole 1110a having a size corresponding to the cross-sectional profile of a catalytic metal M with the graphene G synthesized thereon.

In this way, it is possible to minimize loss of the graphene (G) during passage of the catalytic metal M with the graphene G synthesized thereon through the outlet port 120.

The sealing guide 111 or 121 may include multiple sealing guides arranged inside the inlet port 110 or the outlet port 120 in a movement direction of the catalytic metal M. In the embodiment shown in FIG. 1, a pair of sealing guides 111 or 121 is arranged inside the inlet port 110 or the outlet port 120 with a distance therebetween in the movement direction of the catalytic metal M.

Here, a space defined between the pair of sealing guides 111 or 121 may be connected to an auxiliary vacuum pump 155.

That is, the auxiliary vacuum pump 155 may evacuate the space between the pair of sealing guides 111 or 121. Upon evacuation of the space between the pair of sealing guides 111 or 121, the sealing member of each of the pair of sealing guides 111 or 121 can stably maintain a vacuum pressure in the space.

As a result, it is possible to prevent a drop in vacuum pressure inside the chamber 100 in the course of moving the catalytic metal M from the feed unit 200 under atmospheric pressure into the chamber 100 under a high vacuum atmosphere.

Since the auxiliary vacuum pump 155 is configured to evacuate the space between the pair of sealing guides 111 or 121 disposed in the inlet port 110 or the outlet port 120 unlike the main vacuum pump 150 configured to evacuate the chamber 100, a low-capacity vacuum pump may be used as the auxiliary vacuum pump 155.

As an alternative to use of the auxiliary vacuum pump 155, the space between the pair of sealing guides 111 or 121 may be directly connected to the main vacuum pump 150 connected to the chamber 100. That is, the main vacuum pump 150 may serve to evacuate both the chamber 100 and the space between the pair of sealing guides 111 or 121 disposed in the inlet port 110 or the outlet port 120.

Disposition of the feed unit 200 and the collection unit 300 at the outside of the chamber 100 under atmospheric pressure can eliminate the need to dispose related devices, such as the catalytic metal M, the feed roller 201, a feed motor, and the collection roller 301, inside the chamber 110, thereby allowing space saving and downsizing of the chamber 100.

In addition, disposition of the feed unit 200 and the collection unit 300 at the outside of the chamber 100 under atmospheric pressure can facilitate preparation of the catalytic metal M for manufacture of the graphene G, management of connection between a graphene synthesis process and previous/subsequent processes, and the like.

Further, separation of the collection unit 300, which collects the catalytic metal M with the graphene G synthesized thereon, from the inside of the chamber 100, in which synthesis of the graphene G is performed, can help to prevent synthesized graphene G from being contaminated with various evaporative emissions generated during synthesis of the graphene G in the chamber 100.

The first roller unit 400 and the second roller unit 500 provide regions for actual synthesis of the graphene G on the catalytic metal M, and are disposed inside the chamber 100 with a distance therebetween to support the catalytic metal M passing through the inside of the chamber 110 and to heat the catalytic metal M by Joule heating using electric current supplied from an external power supply (not shown) for synthesis of the graphene G.

The first roller unit 400 and the second roller unit 500 may be disposed to support the catalytic metal M passing through the inside of the chamber 100. That is, the first roller unit 400 and the second roller unit 500 may be configured to support the catalytic metal M through close contact with the catalytic metal M so as to smoothly deliver electric current for Joule heating to the catalytic metal M.

That is, the first roller unit 400 may include a first electrode roller 410 and a first support roller 420, and the second roller unit 500 may include a second electrode roller 510 and a second support roller 520.

Since the first roller unit 400 and the second roller unit 500 have the same structure, only the first roller unit 400 will be described in detail.

The first electrode roller 410 heats the catalytic metal M using electric current supplied from the power supply. The first electrode roller 410 can stably support the catalytic metal M through line or surface contact with the catalytic metal M, can deliver uniform current to the catalytic metal M, and can prevent the catalytic metal M from being damaged due to slip through a rolling operation associated with movement of the catalytic metal M. The first electrode roller 410 may be formed of copper.

The first support roller 420 faces the first electrode roller 410 with the catalytic metal (M) interposed therebetween. The first support roller 420 can stably support the catalytic metal M through line or surface contact with the catalytic metal M and can prevent the catalytic metal M from being damaged due to slip through a rolling operation associated with movement of the catalytic metal M.

As such, the first electrode roller 410 and the first support roller 420 can guide movement of the catalytic metal M while stably contacting and supporting upper and lower surfaces of the catalytic metal M, respectively.

Here, the first electrode roller 410 and the first support roller 410 may be connected through a distance adjustment member 430. For example, the distance adjustment member 430 may be implemented in the form of a slot that has one end connected to a shaft of the first electrode roller 410 and the other end connected to a shaft of the first support roller 420 and allows the shaft of the first electrode roller 410 or the first support roller 420 to be slid on at least one end region of the slot.

That is, as the shaft of the first electrode roller 410 or the first support roller 420 is slid in the slot, the first electrode roller 410 and the first support roller 410 are moved toward or away from each other, whereby the distance between the first electrode roller 410 and the first support roller 420 can be adjusted.

In this way, the distance between the first electrode roller 410 and the first support roller 420 and the distance between the second electrode roller 510 and the second support roller 520 can be adjusted using the distance adjustment member 430 depending on the thickness of the catalytic metal M with the graphene G synthesized thereon, thereby allowing stable support for the catalytic metal M or the catalytic metal M with the graphene G synthesized thereon. In addition, through this, the catalytic metal M passing through a section between the first roller unit 400 and the second roller unit 500 can have a uniform length.

Further, the first electrode roller 410/the first support roller 420 and the second electrode roller 510/the second support roller 520 can deliver more uniform electric current to the catalytic metal M passing therethrough through uniform contact with the catalytic metal M, and can better prevent damage to the catalytic metal M due to slip of the catalytic metal M through a rolling operation associated with movement of the catalytic metal M passing therethrough.

Like the first electrode roller 410 and the second electrode roller 510, the first support roller 420 and the second support roller 520 may also be supplied with electric current for Joule heating of the catalytic metal M. To this end, the first support roller 420 and the second support roller 520 may also be formed of copper, like the first electrode roller 410 and the second electrode roller 510.

Rotational speeds of the first roller unit 400 and the second roller unit 500 may be controlled independently of each other.

More specifically, the rotational speed of each of the first electrode roller 410/the first support roller 420 and the second electrode roller 510/the second support roller 520 may be individually controlled by the controller 600.

Here, the first electrode roller 410 and the first support roller 420 may be a driving shaft and a driven shaft, respectively. Similarly, the second electrode roller 510 and the second support roller 520 may be a driving shaft and a driven shaft, respectively.

Alternatively, the first support roller 420 and the first electrode roller 410 may be a driving shaft and a driven shaft, respectively. Similarly, the second support roller 520 and the second electrode roller 510 may be a driving shaft and a driven shaft, respectively.

Such individual control over the rotational speed of each of the first roller unit 400 and the second roller unit 500 allows fine control over the total length of the catalytic metal passing through the section between the first roller unit 400 and the second roller unit 500. Details thereof will be described further below.

The graphene manufacturing device according to the embodiment provides a mechanism for compensating for temperature variation in the catalytic metal M passing through the section between the first roller unit 400 and the second roller unit 500, that is, a synthesis region.

That is, the catalytic metal M passing through the section between the first roller unit 400 and the second roller unit 500 may be positioned such that a first region A1 of the catalytic metal M close to the first roller unit 400 and a second region A2 of the catalytic metal M close to the second roller unit 500 have respective movements paths facing each other.

In other words, with regard to the catalytic metal M passing through the section between the first roller unit 400 and the second roller unit 500, the first region A1 and the second region A2 of the catalytic metal M, which are located at opposite sides close to the first roller unit 400 and the second roller unit 500 with respect to a central region of the catalytic metal M farthest from the first roller unit 400 and the second roller unit 500, may have respective movement paths facing each other with a predetermined distance therebetween.

According to this embodiment, as the catalytic metal M passing through the section between the first roller unit 400 and the second roller unit 500 sags between the first roller unit 400 and the second roller unit 500, the first region A1 and the second region A2 have the respective movement paths facing each other.

Figure 3:
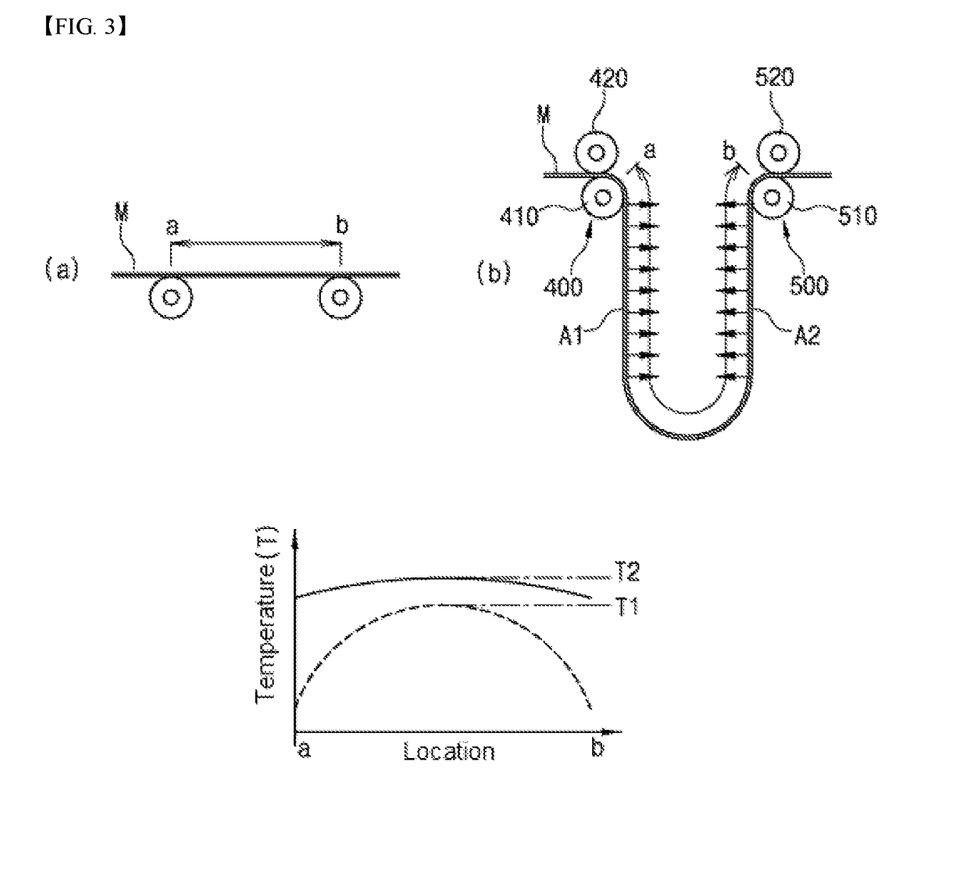
FIG. 3 shows comparison between a location-dependent temperature profile of a catalytic metal passing through a region between a first electrode roller and a second electrode roller of a conventional graphene manufacturing device and a location-dependent temperature profile of a catalytic metal passing through a region between the first electrode roller and the second electrode roller of the graphene manufacturing device according to this embodiment.

FIG. 3 shows a graph comparing a location-dependent temperature profile of a catalytic metal passing through a section between a first electrode roller and a second electrode roller of a conventional graphene manufacturing device with a location-dependent temperature profile of a catalytic metal passing through the section region between the first electrode roller and the second electrode roller of the graphene manufacturing device according to the embodiment of the present invention.

First, the dotted line on the graph represents the location-dependent temperature profile of the catalytic metal that maintains a horizontal movement path between the first electrode roller and the second electrode roller of the conventional graphene manufacturing device, as shown in FIG. 3(a).

That is, as shown by the dotted line on the graph, when the catalytic metal M is heated by electric current delivered through the first electrode roller and the second electrode roller, heat dissipation occurs due to resistance of the first electrode roller and the second electrode upon passage of the electric current through the electrode rollers, which produces a non-uniform temperature profile in which the temperature of the catalytic metal M sharply decreases from a central region farthest from the electrode rollers toward end regions close to the electrode rollers.

Accordingly, in the conventional graphene manufacturing device in which the catalytic metal M maintains the horizontal movement path between the first electrode roller and the second electrode roller, temperature variation occurs across the entire area of the catalytic metal M passing through the section between the first electrode roller and the second electrode roller upon Joule heating of the catalytic metal M through the electrode rollers, making it difficult to synthesize uniform graphene.

The solid line on the graph represents the location-dependent temperature profile of the catalytic metal M that sags between the first roller unit 400 and the second roller unit 500 such that the first region A1 close to the first electrode roller 410 and the second region A2 close to the second electrode roller 510 have respective movement paths facing each other, as shown in FIG. 3(*b*).

According to the embodiment of the present invention, in an early stage of heating of the catalytic metal M using electric current supplied through the first electrode roller 410 and the second electrode roller 510, the temperature of the catalytic metal M can decrease from the central region farthest from the electrode rollers toward the opposite ends close to the electrode rollers.

However, since, except for the central region of the catalytic metal M farthest from the electrode rollers, the first region A1 and the second region A2 leading to the opposite ends of the catalytic metal M close to the electrode roller are positioned to face each other with a predetermined distance therebetween, the regions of the catalytic metal M facing each other can emit heat toward each other and exchange radiant heat with each other. As a result, the temperature profile in the first region A1 and the second region A2 of the catalytic metal M facing each other can be substantially increased, as shown by the solid line on the graph.

Accordingly, as shown in the graph, the temperature profile (solid line) of the catalytic metal M according to the embodiment of the present invention is more uniform across the entire area of the catalytic metal M than the temperature profile (dotted line) of the catalytic metal M according to the conventional graphene manufacturing device, whereby substantially uniform graphene G can be obtained.

In addition, since the catalytic metal M according to the embodiment of the present invention sags between the first roller unit 400 and the second roller unit 500 and thus maintains a "U"-shaped movement path, it is possible to provide a greenhouse effect, by which heat is trapped in a space defined by the first area A1 and the second area A2 of the catalytic M facing each other.

As a result, as shown in the graph, the temperature profile (solid line) of the catalytic metal M according to the present invention can be generally higher (T1<T2) than the temperature profile (dotted line) of the catalytic metal M according to the conventional graphene manufacturing device due to the greenhouse effect occurring in the space defined by the first area A1 and the second area A2 of the catalytic metal M facing each other.

Heat trapped in the space defined by the first area A1 and the second area A2 of the catalytic M facing each other can help to maintain a more uniform temperature across the entire area of the catalytic metal M over which the graphene G is synthesized while allowing maintenance of a high temperature profile with relatively little energy consumption, thereby allowing more efficient manufacture of uniform graphene G.

Furthermore, the graphene manufacturing device according to the embodiment can produce a uniform temperature profile over a large length (area) of the catalytic metal M passing the section between the first roller unit 400 and the second roller unit 500, as compared with the conventional graphene manufacturing device, thereby ensuring a significantly high yield of high-quality graphene G.

Figure 4:
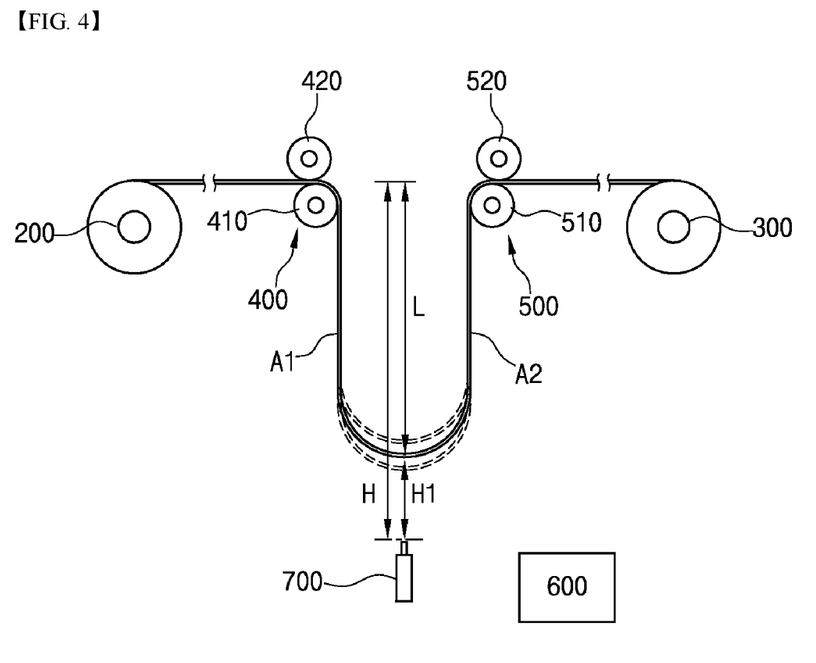
FIG. 4 is a schematic diagram illustrating a movement path of the catalytic metal through control over the first roller unit and the second roller unit according to one embodiment of the present invention.

FIG. 4 is a schematic diagram illustrating a movement path of the catalytic metal through control over the first roller unit and the second roller unit according to one embodiment of the present invention.

Referring to FIG. 1 and FIG. 4, the graphene manufacturing device according to the embodiment of the present invention may further include a displacement sensor 700 detecting a movement path of the catalytic metal M passing through the section between the first roller unit 400 and the second roller unit 500.

More specifically, the displacement sensor 700 according to the embodiment may be disposed below the first roller unit 400 and the second roller unit 500 to detect whether a sagging length of the catalytic metal M with respect to the first roller unit 400 and the second roller unit 500 matches a reference sagging length L.

For example, the displacement sensor 700 may be located a predetermined distance H below the first roller unit 400 and the second roller unit 500 to detect whether the sagging length of the catalytic metal M matches the reference sagging length L through measurement of a height H1 of a lowermost portion (central portion) of the sagging catalytic metal M from the displacement sensor 700.

Here, the controller 600 may control the rotational speed of the first roller unit 400 or the second roller unit 500 to match the sagging length of the catalytic metal M detected by the displacement sensor 700 with the reference sagging length L.

For example, when the sagging length of the catalytic metal M is greater than the reference sagging length L, the controller 600 may reduce the rotational speed of the first roller unit 400 or increase the rotational speed of the second roller unit 500 to match the sagging length of the catalytic metal M with the reference sagging length L. On the contrary, when the sagging length of the catalytic metal M is smaller than the reference sagging length L, the controller 600 may increase the rotational speed of the first roller unit 400 or reduce the rotational speed of the second roller unit 500 to match the sagging length of the catalytic metal M with the reference sagging length L.

As such, the reference sagging length L according to this embodiment corresponds to an optimum sagging length that can produce a uniform temperature profile across the entire region of the catalytic metal M passing through the section between the first roller unit 400 and the second roller unit 500.

If the sagging length of the catalytic metal M passing through the section between the first roller unit 400 and the second roller unit 500 is smaller than the reference sagging length L, this indicates that the first region A1 and the second region A2 of the catalytic metal M facing each other are reduced, causing reduction in area over which the graphene G is synthesized on the catalytic metal M and difficulty in efficient heat transfer between the first region A1 and the second region A2.

On the contrary, if the sagging length of the catalytic metal M passing through the section between the first roller unit 400 and the second roller unit 500 is greater than the reference sagging length L, this indicates that the first region A1 and the second region A2 of the catalytic metal M facing each other are enlarged, causing the catalytic metal M to be heated more than is necessary due to excessive heat transfer between the first region A1 and the second region A2 and a large greenhouse effect, despite an advantage of increase in area over which the graphene G is synthesized on the catalytic metal M.

As such, consistent maintenance of the sagging length of the catalytic metal M passing through the synthesis region A at the reference sagging length L can ensure consistent maintenance of a generally uniform temperature profile across the catalytic metal M and consistent manufacture of uniform graphene G.

Since the catalytic metal M passing through the section between the first roller unit 400 and the second roller unit 500 is positioned to sag by gravity, as described above, the catalytic metal M passing through the section between the first roller unit 400 and the second roller unit 500 is in a non-tensioned state regardless of the feed rate of the feed unit 200 and the collection rate of the collection unit 300. Accordingly, it is possible to prevent the catalytic metal from being broken due to excessive tension during graphene synthesis.

Due to change in length (sagging length) of the catalytic metal M through control over the rotational speed of the first roller unit 400 and the second roller unit 500 as described above, the catalytic metal can be displaced from a horizontal position upon passing through a section between the first roller unit 400 and the first roller unit 400 or passing through a section between the second roller unit 500 and the collection unit 300. In order to resolve such a problem, the controller 600 may individually control each of the feed unit 200 and the collection unit 300 to compensate for displacement of the catalytic metal from the horizontal position upon passing through the section between the first roller unit 400 and the first roller unit 400 or passing through the section between the second roller unit 500 and the collection unit 300.

Although not shown, the graphene manufacturing device according to the embodiment may further include a temperature sensor detecting the temperature of the catalytic metal.

The temperature sensor may measure the temperature of the catalytic metal M in real time and may transmit the measured value to the controller 600.

Basically, the controller 600 may supply appropriate power to the first roller unit 400 and the second roller unit 500 through the power supply (not shown) to match the temperature of the catalytic metal M with a preset reference temperature (graphene synthesis temperature).

Figure 5:
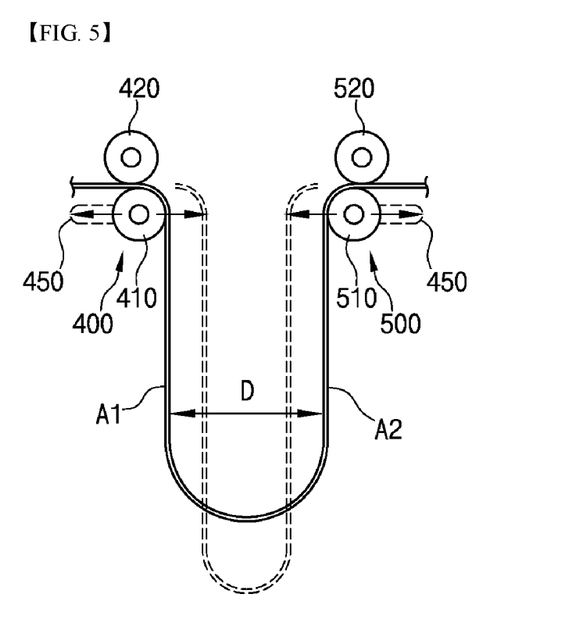
FIG. 5 is a schematic diagram illustrating changes in movement path of the catalytic metal M through control over a roller moving member according to one embodiment of the present invention.

FIG. 5 is a schematic diagram illustrating changes in movement path of the catalytic metal M through control over a roller moving member according to one embodiment of the present invention.

Referring to FIG. 1 and FIG. 5, the graphene manufacturing apparatus according to the embodiment of the present invention may further include a roller moving member 450 allowing the first roller unit 400 and the second roller unit 500 to be moved toward or away from each other to adjust a distance between the first region A1 and the second region A2 of the catalytic metal M passing through the section between the first roller unit 400 and the second roller unit 500.

For example, the roller moving member 450 may be implemented in the form of a slot that is connected to the shaft of each of the first electrode roller 410 and the second electrode roller 510 and allows the shaft of each of the first electrode roller 410 and the second electrode roller 510 to be horizontally slid in the slot.

That is, as the shaft of each of the first electrode roller 410 and the second electrode roller 510 is horizontally slid in the slot, the first electrode roller 410 and the second electrode roller 510 are moved toward or away from each other, whereby the distance between the first electrode roller 410 and the second electrode roller 510 can be adjusted.

Alternatively, the roller moving member 450 may be provided to the first support roller 420 and the second support roller 520.

As shown in FIG. 5, for example, when the roller moving member 450 is operated to move the first roller unit 400 and the second roller unit 500 in the direction toward each other, the first region A1 and the second region A2 of the catalytic metal M facing each other are moved toward each other, causing increase in sagging length of the catalytic metal M. Reduction in distance D between the first region A1 and the second region A2 results in more active heat transfer between the first region A1 and the second region A2 and a more active greenhouse effect.

On the contrary, when the roller moving member 450 is operated to move the first roller unit 400 and the second roller unit 500 in the direction away from each other, the first region A1 and the second region A2 of the catalytic metal M facing each other are moved away from each other, causing reduction in sagging length of the catalytic metal M. Increase in distance D between the first region A1 and the second region A2 results in in less active heat transfer between the first region A1 and the second region A2 and a less active greenhouse effect.

Through adjustment of both the length L of the first region A1 and the second region A2 of the catalytic metal M facing each other and the distance between the first region A1 and the second region A2, the graphene manufacturing apparatus according to the embodiment can ensure more efficient device control to heat the catalytic metal M to a temperature required for graphene synthesis with limited power supply.

Figure 6:
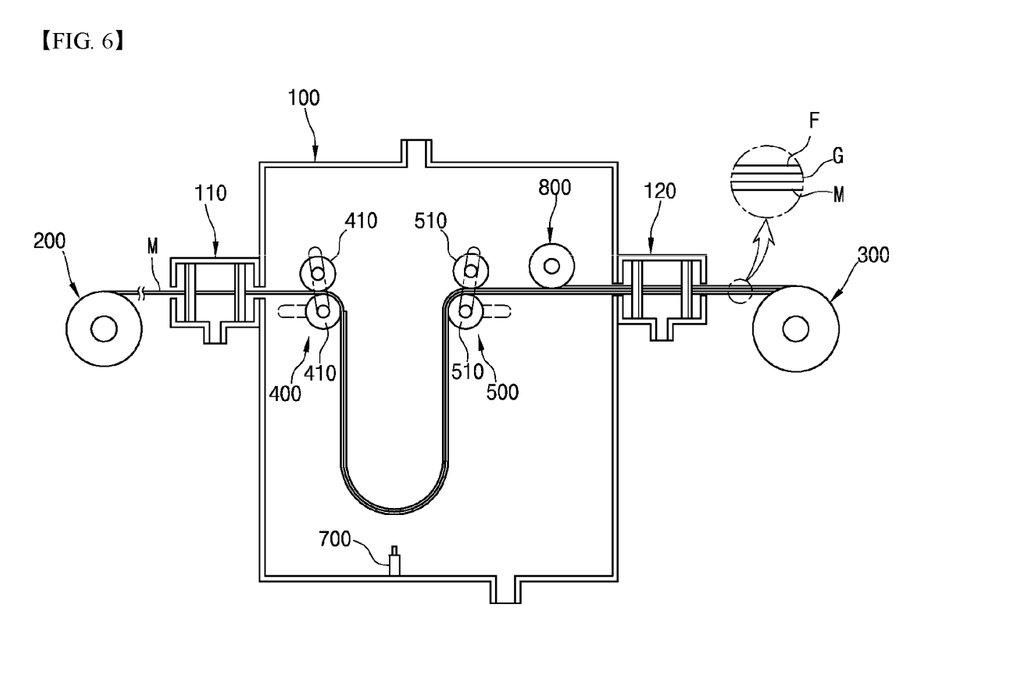
FIG. 6 is a schematic diagram of a graphene manufacturing device according to another embodiment of the present invention.

FIG. 6 is a schematic diagram of a graphene manufacturing device according to another embodiment of the present invention.

Referring to FIG. 6, the graphene manufacturing device according to this embodiment may further include a protective film feed unit 800 disposed inside the chamber 100 to form a protective film F layer on a graphene layer G of the catalytic metal M having passed through the first roller unit 400 and the second roller unit 500.

The protective film F is formed of an adhesive material and is attached to the graphene G layer of the catalytic metal M.

For example, the protective film feed unit 800 may be implemented in the form of a feed roller that is rotated at the same speed as the feed unit 200 and the collection unit 300, and may provide the protective film F to the catalytic metal M with the graphene G synthesized thereon, which has passed through the first roller unit 400 and the second roller unit 500, to attach the protective film F on the graphene G layer of the catalytic metal M.

Discharging the catalytic metal M with the graphene G synthesized thereon from the chamber 100 under the vacuum atmosphere to an outside atmospheric environment after attachment of the protective film F to the graphene G layer as described above can help to minimize loss of the graphene G while allowing obtainment of high-quality graphene G.

Next, a graphene manufacturing method using the graphene manufacturing device set forth above will be described.

Referring back to FIG. 1, a graphene manufacturing method according to one embodiment of the present invention may include a supply step, a positioning step, a synthesis step, and a collection step.

In the supply step, the catalytic metal M is supplied into the chamber 100. For example, supply of the catalytic metal M into the chamber 100 may be achieved through operation of the feed roller 201 of the feed unit 200.

In the positioning step, the catalytic metal M passing through the section between the first roller unit 400 and the second roller unit 500 disposed inside the chamber 100 is positioned such that the first region A1 of the catalytic metal M close to the first roller unit 400 and the second region A2 of the catalytic metal M close to the second roller unit 500 have respective movement paths facing each other.

More specifically, the catalytic metal M supplied into the chamber 100 sags by gravity downwardly of the first and second roller units 400, 500 while passing through the section between the first roller unit 400 and the second roller unit 500, whereby the first region A1 and the second region A2 can have respective movement paths facing each other.

After the catalytic metal M is positioned such that the first region A1 and the second region A2 of the catalytic metal M passing through the section between the first roller unit 400 and the second roller unit 500 have the respective movement paths facing each other, the sagging length of the catalytic metal M may be more accurately set to the reference sagging length L (see FIG. 4).

In other words, the sagging length of the catalytic metal M can be more accurately set to match the optimum reference sagging length L depending on various synthesis parameters, such as a present initial distance between the first roller unit 400 and the second roller unit 500, a power level delivered from the power supply, power supply time (heating time), the types of catalytic metal M used, the profile size of the catalytic metal M used, the types of reaction gas in the chamber 110, and the like.

For example, the graphene manufacturing method may further include a detection step in which whether the sagging length of the catalytic metal M with respect to the first roller unit 400 and the second roller unit 500 matches the preset reference sagging length L is detected using the displacement sensor 700 and an adjustment step in which the rotational speed of the first roller unit 400 or the second roller unit 500 is controlled to match the sagging length of the catalytic metal M with the reference sagging length L.

As such, the adjustment step in which the sagging length of the catalytic metal M is adjusted to the reference sagging length L using the displacement sensor 700 may be consistently performed during synthesis of the graphene G, thereby ensuring consistent maintenance of a uniform temperature profile across the catalytic metal M during synthesis of the graphene G.

In the synthesis step performed after completion of positioning of the movement paths of the catalytic metal M inside the chamber 100, the graphene G is actually synthesized on the catalytic metal M located between the first roller unit 400 and the second roller unit 500.

That is, the reaction gas needed for synthesis of the graphene G is injected into the chamber 100, and the first roller unit 400 and the second roller unit 500 heat the catalytic metal M by Joule heating using electric current supplied from the power supply.

As the catalytic metal M located between the first roller unit 400 and the second roller unit 500 is heated, the first region A1 of the catalytic metal M close to the first roller unit 400 and the second region A2 of the catalytic metal M close to the second roller unit 500, which face each other with a predetermined distance therebetween, emit heat toward each other, thereby producing a uniform temperature profile required for synthesis of uniform graphene across the entire area of the catalytic metal M passing through the section between the first roller unit 400 and the second roller unit 500.

Synthesis of the graphene G on the catalytic metal M maintaining such a uniform temperature profile is performed for a predetermined period of time.

The graphene manufacturing method may further include, after completion of synthesis of the graphene G on the catalytic metal M located between the first roller unit 400 and the second roller unit 500, a protective film forming step in which the protective layer F is formed on the graphene G layer of the catalytic metal M having passed through the first roller unit 400 and the second roller unit 500 using the protective film feed unit 800 (see FIG. 6).

In the collection step, the catalytic metal M with the graphene G synthesized thereon is collected from the chamber. After completion of synthesis of the graphene G on the catalytic metal located between the first roller unit and the second roller unit and formation of the protective layer F on the graphene G layer, the collection roller of the collection unit is operated to collect the catalytic metal M with the graphene G synthesized thereon from the chamber.

As described above, the graphene manufacturing device according to the embodiments of the present invention allows the catalytic metal M passing through the section between the first roller unit 400 and the second roller unit 500 to be positioned such that the first region A1 and the second region A2 of the catalytic metal M, which are located at opposite sides close to the electrode rollers with respect to the central region farthest from the electrode rollers, can have respective movement paths facing each other to exchange radiant heat with each other, and thus can produce a uniform temperature profile across the entire area of the catalytic metal M passing through the section between the first roller unit 400 and the second roller unit 500. As a result, uniform graphene G can be obtained.

In addition, the graphene manufacturing device and the graphene manufacturing method according to the embodiments of the present invention provide not only thermal compensation between the first region A1 and the second region A2 of the catalytic metal M facing each other, but also a greenhouse effect in a space defined by the first region A1 and the second region A2, and thus can ensure uniform maintenance of a high temperature profile across the entire area of the catalytic metal M with limited power supply.

Further, the graphene manufacturing device and the graphene manufacturing method according to the embodiments of the present invention can accurately set and adjust the lengths of the first region A1 and the second region A2 of the catalytic metal M facing each other through control over the first roller unit 400 and the second roller unit 500 based on a value detected by the displacement sensor 700, thereby ensuring maintenance of a uniform temperature profile across the catalytic metal M during synthesis of the graphene G Furthermore, the graphene manufacturing device and the graphene manufacturing method according to the embodiments of the present invention can ensure space saving and downsizing of the chamber and can facilitate preparation for manufacture of the graphene G and management of previous/subsequent processes through disposition of the feed unit 200/the collection unit 300 at the outside of the chamber, that is, in an atmospheric pressure environment.

In particular, through separation of the collection unit 300, which collects the catalytic metal M with the graphene G synthesized thereon, from the chamber 100 in which synthesis of the graphene G is performed, it is possible to prevent synthesized graphene from being contaminated with various evaporative emissions generated in the chamber during synthesis of the graphene G.

Moreover, with the sealing guides 111, 121 guiding movement of the catalytic metal M into/out of the chamber 100, the graphene manufacturing device and the graphene manufacturing method according to the embodiments of the present invention can ensure damage/loss free transfer of bare catalytic metal M or catalytic metal M with graphene G synthesized thereon and stable maintenance of a vacuum atmosphere inside the chamber 100 through prevention of intrusion of external air.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

INDUSTRIAL APPLICABILITY

The present invention is industrially applicable in the field of graphene manufacturing technology using Joule heating, that is, a process by which passage of electric current through a conductor produces heat.

The invention claimed is:

1. A graphene manufacturing device comprising:
   a chamber having an inner space for graphene synthesis; and
   a first roller unit and a second roller unit disposed in the chamber with a distance therebetween, supporting a catalytic metal passing through an inside of the chamber, and heating the catalytic metal by Joule heating using electric current supplied thereto for graphene synthesis,
   wherein a first region of the catalytic metal close to the first roller unit and a second region of the catalytic metal close to the second roller unit are positioned to have respective movement paths facing each other as the catalytic metal is sagged downwardly between the first roller unit and the second roller unit to compensate for temperature variation in the catalytic metal passing through a section between the first roller unit and the second roller unit.

2. The graphene manufacturing device according to claim 1, further comprising:
   a displacement sensor disposed below the first roller unit and the second roller unit and detecting whether a sagging length of the catalytic metal with respect to the first roller unit and the second roller unit matches a reference sagging length; and
   a controller controlling a rotational speed of the first roller unit or the second roller unit to match the sagging length of the catalytic metal detected by the displacement sensor with the reference sagging length.

3. The graphene manufacturing device according to claim 1, wherein the chamber comprises: an inlet port through which the catalytic metal is introduced into the chamber; and an outlet port through which the catalytic metal with graphene synthesized thereon is discharged from the chamber, the graphene manufacturing device further comprising:
   a sealing guide disposed in each of the inlet port and the outlet port and having a guide hole elastically contacting a surface of the catalytic metal passing therethrough to guide movement of the catalytic metal and to prevent intrusion of external air.

4. The graphene manufacturing device according to claim 3, wherein the sealing guide comprises a pair of sealing guides spaced apart from each other in a movement direction of the catalytic metal, the graphene manufacturing device further comprising:
   an auxiliary vacuum pump evacuating a space between the pair of sealing guides.

5. The graphene manufacturing device according to claim 3, wherein the sealing guide comprises: a guide body having a first through-hole through which the catalytic metal passes; a guide cover having a second through-hole through which the catalytic metal passes; a sealing member interposed between the guide body and the guide cover and having the guide hole; and a fastening member fastening the guide body and the guide cover to each other with the sealing member interposed therebetween.

6. The graphene manufacturing device according to claim 3, wherein the guide hole disposed in the outlet port has a larger size than the guide hole disposed in the inlet port.

7. The graphene manufacturing device according to claim 1, further comprising:
   a protective film feed unit disposed inside the chamber to form a protective layer on a graphene layer of the catalytic metal having passed through the first roller unit and the second roller unit.

8. The graphene manufacturing device according to claim 1, further comprising:
   a roller moving member allowing the first roller unit and the second roller unit to be moved toward each other or away from each other to adjust a distance between the first region and the second region.

9. A graphene manufacturing method using the graphene manufacturing device according to claim 1, the graphene manufacturing method comprising:
   a supply step in which the catalytic metal is supplied into the chamber;
   a positioning step in which the catalytic metal is positioned in the chamber such that the first region of the catalytic metal close to the first roller unit and the second region of the catalytic metal close to the second roller unit have respective movement paths facing each other to compensate for temperature variation in the catalytic metal passing through the section between the first roller unit and the second roller unit;
   a synthesis step in which graphene is synthesized on the catalytic metal; and
   a collection step in which the catalytic metal with the graphene synthesized thereon is collected from the chamber.

10. The graphene manufacturing method according to claim 9, wherein, in the positioning step, the first region and the second region have the respective movement paths facing each other as the catalytic metal sags between the first roller unit and the second roller unit.

11. The graphene manufacturing method according to claim 10, further comprising:
- a detection step in which whether a sagging length of the catalytic metal with respect to the first roller unit and the second roller unit matches a reference sagging length is detected; and
- an adjustment step in which a rotational speed of the first roller unit or the second roller unit is controlled to match the sagging length of the catalytic metal with the reference sagging length, the detection step and the adjustment step being performed after the positioning step.

12. The graphene manufacturing method according to claim 9, further comprising:
- a protective film forming step in which a protective layer is formed on a graphene layer of the catalytic metal having passed through the first roller unit and the second roller unit, the protective film forming step being performed after the synthesis step.

\* \* \* \* \*